(12) United States Patent
Petousis et al.

(10) Patent No.: US 11,587,367 B2
(45) Date of Patent: *Feb. 21, 2023

(54) SYSTEMS AND METHODS FOR PROCESSING VEHICLE SENSOR DATA

(71) Applicant: Woven Planet North America, Inc., Los Altos, CA (US)

(72) Inventors: Ioannis Petousis, Campbell, CA (US); Christopher Heiser, Campbell, CA (US); Owen Davis, Campbell, CA (US)

(73) Assignee: WOVEN PLANET NORTH AMERICA, INC., Los Altos, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/021,422

(22) Filed: Sep. 15, 2020

(65) Prior Publication Data

US 2020/0410787 A1  Dec. 31, 2020

Related U.S. Application Data

(63) Continuation of application No. 15/916,546, filed on Mar. 9, 2018, now Pat. No. 10,810,806.
(Continued)

(51) Int. Cl.
*G07C 5/00* (2006.01)
*G07C 5/08* (2006.01)
*H04W 4/44* (2018.01)

(52) U.S. Cl.
CPC .......... *G07C 5/008* (2013.01); *G07C 5/0841* (2013.01); *H04W 4/44* (2018.02)

(58) Field of Classification Search
CPC ........ G07C 5/008; G07C 5/0841; H04W 4/44
(Continued)

(56) References Cited

U.S. PATENT DOCUMENTS 4,255,789 A   3/1981  Hartford et al.
8,370,392 B1  2/2013  Hunt
(Continued)

FOREIGN PATENT DOCUMENTS

EP   1405769 A1 *  4/2004  ............. B60R 21/00
EP   3115745 A1 *  1/2017  ........... B62D 15/025
(Continued)

OTHER PUBLICATIONS

Doo et al., "A Study on the Architecture of the In-Vehicle Wireless Sensor Network System," 2013, Publisher: IEEE.*
(Continued)

*Primary Examiner* — Tuan C To
(74) *Attorney, Agent, or Firm* — Christopher G. Darrow; Darrow Mustafa PC

(57) ABSTRACT

A system and method that includes collecting vehicle sensor data, wherein prioritizing vehicle sensor data includes identifying a level of importance for each of a plurality of vehicle sensor data types included in the vehicle sensor data; generating a vehicle sensor data schedule, wherein generating the vehicle data schedule includes one or more of (i) identifying a transmission order for each of the plurality of vehicle sensor data types and (ii) identifying a storage scheme selected from a hierarchy of data storage types for each of the plurality of vehicle sensor data types; transforming vehicle sensor data into message data, wherein the transforming includes selectively converting one or more of the vehicle sensor data types of the vehicle sensor data to a messaging format based on the prioritization; and transmitting, via one or more selected communication networks, the message data according to the vehicle sensor data schedule.

20 Claims, 6 Drawing Sheets

Related U.S. Application Data

(60) Provisional application No. 62/470,776, filed on Mar. 13, 2017.

(58) Field of Classification Search
USPC .................................................. 701/31.5
See application file for complete search history.

(56) References Cited

U.S. PATENT DOCUMENTS

| | | |
|---|---|---|
| 8,676,743 B2 | 3/2014 | Kumar |
| 8,954,226 B1 | 2/2015 | Binion et al. |
| 9,077,586 B2* | 7/2015 | Yousefi .................... H04L 45/74 |
| 9,603,158 B1* | 3/2017 | Ross ...................... H04L 67/535 |
| 9,860,129 B2* | 1/2018 | Zinger ................. H04W 40/246 |
| 9,918,135 B1* | 3/2018 | Truong .............. H04N 21/4784 |
| 9,958,864 B2 | 5/2018 | Kentley-Klay et al. |
| 9,961,713 B2* | 5/2018 | Salkintzis ............. H04W 84/00 |
| 10,162,736 B2 | 12/2018 | Bhuiya et al. |
| 10,469,408 B2 | 11/2019 | Yousefi et al. |
| 10,810,806 B2* | 10/2020 | Petousis .................. H04W 4/44 |
| 2007/0153802 A1 | 7/2007 | Anke et al. |
| 2007/0185646 A1 | 8/2007 | Neugebauer et al. |
| 2009/0010205 A1* | 1/2009 | Pratt, Jr. ........... H04W 56/0015 370/328 |
| 2010/0290441 A1 | 11/2010 | Stewart |
| 2011/0188494 A1 | 8/2011 | Johnson et al. |
| 2012/0215893 A1* | 8/2012 | Bisdikian .............. G06F 9/5011 709/223 |
| 2014/0067257 A1 | 3/2014 | Dave et al. |
| 2014/0306833 A1* | 10/2014 | Ricci .................... G06Q 20/308 340/901 |
| 2015/0112543 A1 | 4/2015 | Binion et al. |
| 2015/0257166 A1 | 9/2015 | Weizman et al. |
| 2015/0356796 A1 | 12/2015 | Jackson |
| 2016/0009291 A1 | 1/2016 | Pallett et al. |
| 2016/0014793 A1* | 1/2016 | Klemp .................. H04W 72/06 370/329 |
| 2016/0103002 A1 | 4/2016 | Milota et al. |
| 2016/0119165 A1* | 4/2016 | Keronen ............. H04L 12/4641 370/254 |
| 2017/0162057 A1* | 6/2017 | Ross .................... B60W 10/20 |
| 2017/0187783 A1* | 6/2017 | Pogorelik .............. H04L 67/06 |
| 2018/0257643 A1 | 9/2018 | Kroop et al. |

FOREIGN PATENT DOCUMENTS

| | | | |
|---|---|---|---|
| JP | 2009267532 A | 11/2009 | |
| WO | WO-2009008937 A2 * | 1/2009 | ............ G01D 21/00 |
| WO | 2015108460 A1 | 7/2015 | |
| WO | WO-2015183677 A1 * | 12/2015 | ............ H04L 67/12 |

OTHER PUBLICATIONS

John L. Rapanotti, "Vehicle-Network Development based on a Communications-Network Testbed," 2006, Publisher: IEEE.*

* cited by examiner

SYSTEMS AND METHODS FOR PROCESSING VEHICLE SENSOR DATA

CROSS-REFERENCE TO RELATED APPLICATIONS

This application is a continuation of U.S. patent application Ser. No. 15/916,546, filed 9 Mar. 2018, which claims the benefit of U.S. Provisional Application No. 62/470,776, filed 13 Mar. 2017, all of which are incorporated in their entirety by this reference.

TECHNICAL FIELD

This invention relates generally to the autonomous vehicle field, and more specifically to a new and useful method for processing sensor data generated by vehicles.

BACKGROUND

Vehicles can be equipped with many sensors to enable operation and data collection from the surroundings of the vehicle. These sensors typically collect vast quantities of data continuously or nearly-continuously as the vehicle is operating, under human control, or a combination of both. The vehicles are also typically connected to a network (e.g., the Internet) by one or more uplinks of varying types, and possess some amount of onboard storage. These networks typically lack the capacity or capability to uplink all of the data collected by the sensor data in real time or near real time, and onboard storage is often insufficient to store all collected raw data for asynchronous uplink. This can result in real time data loss and degradation, as well as the inability to recall lost data for future use.

Thus, there is a need in the autonomous vehicle field to create a new and useful method for processing vehicle sensor data. This invention provides such a new and useful method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
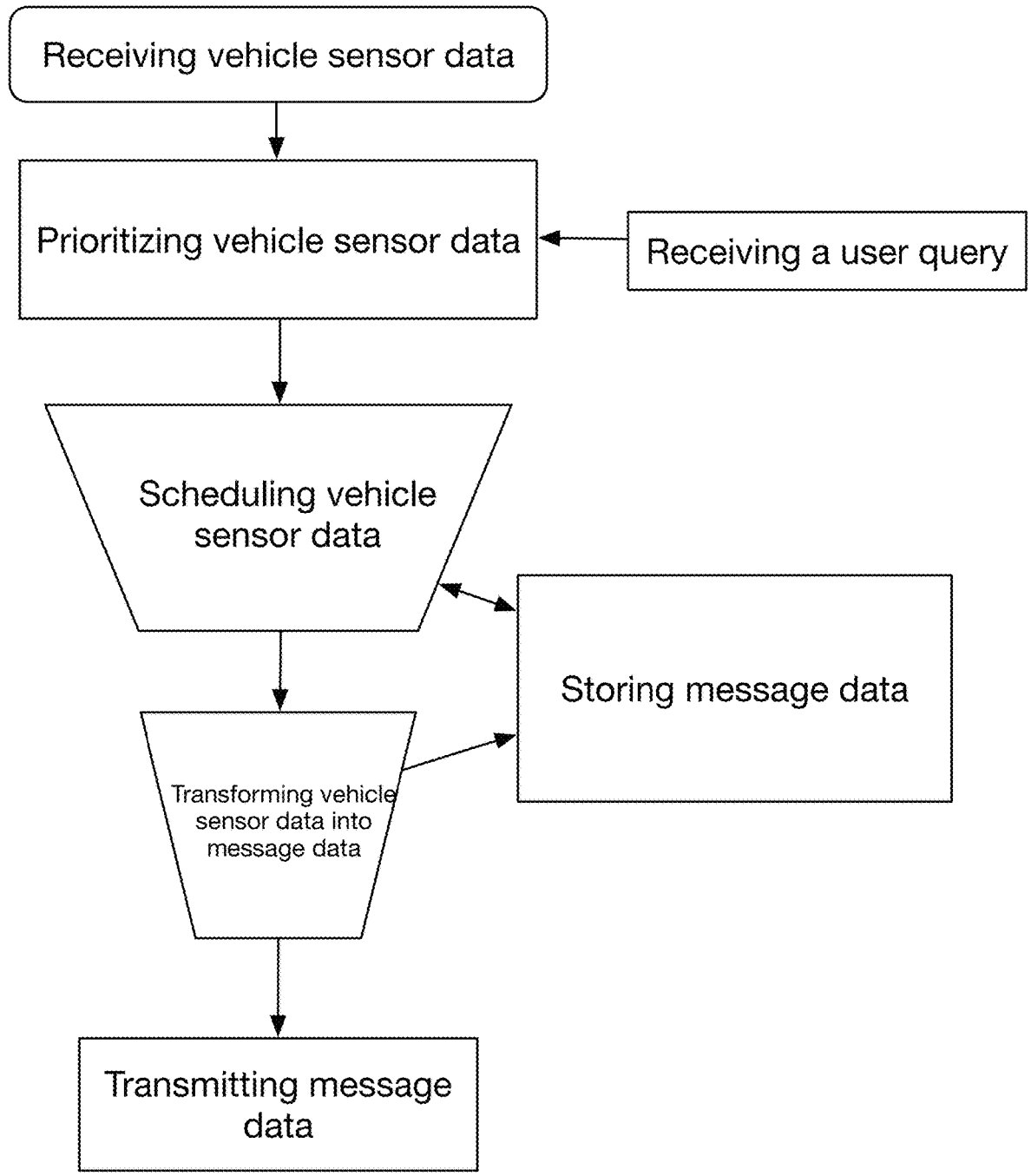
FIG. 1 is a flowchart representation of a variation of the method.

As shown in FIG. 1, the method includes: receiving vehicle sensor data, receiving a prioritization request, prioritizing vehicle sensor data, scheduling vehicle sensor data, determining network quality, transforming vehicle sensor data into message data, transmitting message data, and storing message data. The method functions to recover data from vehicles (e.g., semi-autonomous, fully autonomous) that collect more data than can be suitably uplinked to the network. The method can additionally or alternatively include: retrieving vehicle sensor data, retrieving message data, and any other suitable processes for manipulating vehicle sensor data and/or message data.

In one example implementation of the method, the method can include: receiving a third party request for a vehicle data type, generating a prioritization request for the vehicle data type based on the third party request, receiving the prioritization request at the vehicle system, dynamically re-prioritizing the vehicle data type based on the prioritization request, scheduling transmission of the vehicle data type based on the new priority, and transmitting the data to the remote computing system according to the schedule.

The inventors have discovered that components of autonomous vehicles (e.g., sensors, computing systems, navigation systems, etc.) cooperatively generate too much data during a driving session to practically transfer (e.g., economically, physically limited) to remote systems over conventional communication infrastructure. The amount of data can be so large that even on-board vehicle storage may be untenable.

The inventors have discovered that dynamic data selection systems (e.g., selection engine) and methods can resolve these issues by selectively prioritizing data and scheduling data transmission.

The method can confer several benefits. First, the method optimizes use of the limited communication resources available to the computing system by dynamically prioritizing the data to be sent in real- or near-real time. In one variation, the data can be prioritized based on one or more requests or user queries (e.g., received from a remote computing system, wherein the remote computing system can determine the data priority using a cost function, optimization function, bidding system, contextual system, or other system) (or, based on a number of requests or a number of user queries, etc.). This enables an external system to request and receive data, previously demanded asynchronously, from the vehicle in real- or near-real time. In a second variation, the data can be prioritized based on the current or anticipated quality of service (e.g., as measured by latency, bandwidth, etc.) of available communication channel(s). This allows for critical or other high-value data to have preferential real-time transmission, precluding low-value data from consuming limited communication resources.

Second, variants of the method prioritize data based on the packet content, not just the packet header. This allows for redundant data (e.g., sequential signal frames with differences below a threshold difference, etc.) to be filtered out, which frees up communication bandwidth for higher-value data. For instance, later or subsequent frames of sequential signal frames may be compared to prior signal frames and when the difference between the subsequent frames and the prior (earlier frames) are minimal such that the differences do not satisfy a redundancy threshold, the subsequent signal frames may be classified as redundant and therefore, excluded from the resultant packet content. Accordingly, the resultant packet content is a modified version of the original packet content and may include compressible indicators or data bits that indicate that redundant data was removed enabling the receiver to duplicate the redundant data according to prior frames upon receipt.

Third, variants of the method can backfill downsampled data (previously transmitted over a lower bandwidth connection) with higher-resolution data, which can enable a third party to receive some vehicle data in near-real time, while receiving the remainder asynchronously. For example, the method can store secondary data (e.g., data not selected for transmission) until a secondary transmission event is met (e.g., connection to a high-bandwidth connection, such as Ethernet). The secondary data can be: data lower than a threshold priority, source data (e.g., underlying the transmitted data, such as higher resolution data), surrounding measurements (e.g., physically or temporally), projections of the signal to a certain hyperplane, or any other suitable data.

Fourth, variants of the method can include learning from other instances of the method executing on the same or different vehicles, which can automatically train the selection system to better determine what data is high-value based on the operation context (e.g., driving conditions, location, passenger parameters, etc.), as described in U.S. Provisional Application No. 62/513,564, filed on 1 Jun. 2017, which is incorporated by reference in its entirety.

Fifth, variants of the method can confer increased vehicle security while granting access to vehicle data. For example, the request can be limited to data requests, and exclude vehicle operation updates.

However, the system and method can confer any other suitable set of benefits.

All or some of the processes described herein are preferably performed by a vehicle system in cooperation with a remote computing system, but can alternatively be performed entirely by the remote computing system, the vehicle system, or any other suitable system. The vehicle system is preferably onboard the vehicle (e.g., a vehicle computer integrated with the vehicle), but can additionally or alternatively be decoupled from the vehicle (e.g., a mobile device within the vehicle). The vehicle system includes a processing system (e.g., graphical processing unit or GPU, central processing unit or CPU) as well as memory. The memory can be short term (e.g., volatile, non-volatile, random access memory or RAM, etc.) and/or long term (e.g., flash memory, hard disk, etc.) memory. The vehicle system can also include a wireless communication system (e.g., Wi-Fi, Bluetooth, cellular 3G, cellular 4G, cellular 5G, multiple-input multiple-output or MIMO, one or more radios, or any other suitable wireless communication system or protocol), a wired communication system (e.g., modulated powerline data transfer, Ethernet, or any other suitable wired data communication system or protocol), sensors, and/or a data transfer bus (e.g., CAN, FlexRay). The remote computing system can include a user device (e.g., a mobile phone, a laptop, etc.), a remote server, a cloud server, or any other suitable local and/or distributed computing system remote from the vehicle. The remote computing system is preferably connected to the vehicle system through one or more data connections (e.g., channels), but can alternatively communicate with the vehicle system in any suitable manner.

The vehicle system may employ any suitable machine learning including one or more of: supervised learning (e.g., using logistic regression, back propagation neural networks, random forests, decision trees, etc.), unsupervised learning (e.g., using an Apriori algorithm, k-means clustering, etc.), semi-supervised learning, reinforcement learning (e.g., using a Q-learning algorithm, temporal difference learning, etc.), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolutional network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in classifying vehicle sensor data and/or identifying a level of importance of vehicle sensor data.

One or more instances of the method and/or processes described herein can be performed asynchronously (e.g., sequentially), concurrently (e.g., in parallel), or in any other suitable order and/or using one or more instances of the systems, elements, and/or entities described herein.

Receiving vehicle sensor data functions to receive data for subsequent prioritization, processing, packaging, transmission, and any other blocks of the method. The vehicle sensor data is preferably received through wired connections between vehicle sensor(s) and the vehicle computing system (e.g., the CAN bus), but can additionally or alternatively be received over wireless connections, a combination of wireless and wired connections, or any other suitable connections.

Vehicle sensor data is preferably raw data collected from a sensor of the vehicle, but can be any suitable form of data derived from vehicle sensors. Raw data shall be understood to mean data that is a lossless representation of all information collected by a sensor or sensors; accordingly it may be in any suitable lossless format. Alternatively, the vehicle sensor data can be compressed, derived data (e.g., derivative messages based on sensor data), compounded or combined data (e.g., fused data from multiple sensors, point clouds, feature parameters, object parameters, detected gradients, changes between sequential image frames, errors between a predetermined data model and actual measured data, classification of a data type, detected anomalies above a baseline, etc.), compressed data (e.g., using lossless or lossy compression), data segments, or any other suitable data. Vehicle sensor data can additionally or alternatively be downsampled. Derivative (e.g., derived) data can be specified and/or determined based on a remote request (e.g., specified processing module is activated, and a processing method specified in the remote request is applied to vehicle sensor data to generate the derived data), based on predetermined rules (e.g., always determined, and then stored and/or discarded), based on an application or client (e.g., wherein an on-board or remote third-party application associated with the vehicle requests certain types of derivative data), or determined in any suitable manner.

Vehicle sensor data can originate from any suitable vehicle sensor (e.g., interior or exterior on-board sensors, external sensors, etc.). Such sensors include embedded sensors, GPS systems, LiDAR, radar, cameras, temperature sensors, pressure sensors, position sensors, timers, clocks, and any other suitable sensors. The data can be of any suitable type, including: image data, one-dimensional data (e.g., voltage, current), multi-dimensional data (e.g., point cloud, heatmap, functional surface, other 2D or 3D data, etc.), and/or time series.

Prioritizing the vehicle sensor data functions to determine a level of importance of the received vehicle sensor data and prepare the vehicle sensor data for scheduling. Prioritizing vehicle sensor data preferably includes determining (or selecting) a prioritization scheme, and then prioritizing the vehicle sensor data according to the determined prioritization scheme. Prioritizing the vehicle sensor data is preferably performed by a prioritization module of the vehicle system but can alternatively be performed by any suitable portion or module of the vehicle system. Prioritizing the vehicle sensor data can be based on characteristics of the vehicle sensor data itself (e.g., block size, packet content, compressibility, type, etc.), a prioritization request (e.g., a remote query specifies a type of data or combination of data), an internal criterion (e.g., time of day, preset schedule, etc.), vehicle sensor data analysis (e.g., by the system, a third-party application executing on the vehicle, etc.), derivative data (e.g., recognized object classes), and/or any other suitable criteria. Prioritizing vehicle sensor data can additionally or alternatively include rule-based prioritization, prioritizing based on data classification, prioritizing based on heuristics, and prioritizing based on probability and/or stochasticity. Data being prioritized can include: signal streams and/or sources (e.g., signals from a specific sensor), signal types (e.g., all images, signals from a type of sensor, object vectors in 3-D space, etc.), signals with specific characteristics (e.g., signals matching a specified pattern), or any other suitable signals or data.

Determining the prioritization scheme functions to establish the criteria against which the vehicle sensor data is prioritized. For example, the prioritization scheme specifies the rules and/or algorithms used to determine the priority (e.g., importance), a piece of data should have. Determining the prioritization scheme can be based on a remote query (e.g., a remote query specifies a prioritization scheme or range of possible priorities for each application), the data contents (e.g., the data type, the data values, etc.), a predetermined set of rules, or otherwise determined. The prioritization scheme can be determined automatically (e.g., trained on historical data priorities, such as for contexts with similar data parameters), manually (e.g., specified by a remote query), extracted from a remote query (e.g., a remote query specifies operations level data should be prioritized over application level data, but internally derived parameters prevent the remote query from overriding critical data having the highest prioritization level), or otherwise determined. The prioritization scheme can be determined based on categorical rules, data message or block size, data compressibility, a remote query, or any other suitable basis for prioritization. The prioritization scheme can additionally or alternatively be determined in any suitable manner.

Determining the priority can additionally include determining the priority based on a combination of a remote query and data contents. For example, determining the priority can include ranking the vehicle sensor data according to a remote query, and selectively overruling the ranking specified by the remote query according to the data category (e.g., data in the critical category is given a higher ranking than a user preference of high resolution video data). In particular, the vehicle sensor data may include a plurality of different vehicle sensor data types (e.g., vehicle data from different vehicle sensors, vehicle data collected at different times, etc.) and the vehicle may function to prioritize the vehicle sensor data by ranking the varying vehicle sensor data types within the vehicle sensor data according to a determined level of importance of the data contents of the vehicle sensor data types to the vehicle and/or according to external request by a remote computing system.

In a first variation, the system determines the importance value (e.g., priority value) associated with a piece of vehicle sensor data. The system can determine the importance value based on: a predetermined set of rules (e.g. a machine learning algorithm), the prioritization scheme received in a remote query, or otherwise determine the importance value. The importance value may be identified from a hierarchy of importance ranging from a low relative importance to a high level of importance. The hierarchy of importance may include a plurality of thresholds between each of a plurality of identifiable importance levels. Accordingly, in some embodiments, the importance of a piece of data when the attributes and/or characteristics of that piece of data (and, in some instances based on requests for the piece of data) satisfy a threshold of the hierarchy of importance and traverse into one of the plurality of importance levels. In a specific example, the system can lower the priority of dithering sensor data (e.g., determine not to send, decrease the importance of) because the dithering pattern is determined to be normal after training a machine learning algorithm on the sensor data. In another specific example, the system can define and/or learn a nominal range for sensor data and send sensor data at lower resolution and/or frequency while sensor data values are within the nominal range. In another specific example, the system can confer higher priority values to signals that deviate substantially from a nominal case, either in signal value (simple analysis) or behavior (e.g., as determined by artificial intelligence and/or machine learning algorithms). In another specific example, the system establishes nominal signal characteristics (e.g., value, behavior) for each sensor and characteristics of how sensor signals are interrelated, and confers higher priority on a subset of related sensors (e.g., related by interrelated sensor characteristics and/or behavior, related by sensor purpose, related by sensor data type) when one or more of the sensors of the group deviates from the nominal signal characteristics.

In a second variation, the prioritization scheme is determined by a third-party application, using methods and/or algorithms specific to the third-party application. The third-party application can be executed on-board the vehicle (e.g., in on-board storage, wherein the application processes the vehicle sensor data and assigns an importance or priority value), in the remote computing system (e.g., wherein the third-party application generates a remote query specifying the data types and associated importance), or in any other suitable computing system. Each application can be permitted to assign: any importance (e.g., encompassing the entire possible importance value range), any importance value within a predetermined importance range (e.g., wherein the importance value range can be determined by a payment tier, regulatory scheme, or otherwise determined), a predetermined importance value (e.g., determined based on a payment tier, etc.), or otherwise determined. For example, a first third-party application for lost-children finding can classify an image showing the lost child as a high-priority piece of data, while a second third-party application for monitoring vehicle anomalies can classify anomalous suspension patterns as high-priority.

In another variation, prioritizing the vehicle sensor data according to the determined prioritization scheme can include determining the priority based on the data contents. This variation can include interpreting (e.g., reading, identifying the value or values) the vehicle sensor data (e.g., the signal) and prioritizing based on the result of the interpretation. For example, interpreting the vehicle sensor data can include extracting objects from images, classifying the objects, and prioritize the image data based on the classified objects within the image. This variation can also include ranking vehicle data types according to data category (e.g., ranking critical data ahead of operational data, and operational data ahead of user application data). Ranking vehicle data types can additionally or alternatively be performed within a data category according to data contents or characteristics (e.g., originating sensor type, compressibility, raw data stream or block size, etc.). In a second example, prioritization based on data content includes ranking the relative priority of the vehicle sensor data, based on preferences specified in the prioritization request (e.g., prioritization request). As such, preferences can include an explicit ranked list of vehicle data types, a ranked list of categories of vehicle data (e.g., one dimensional vector data, 2D image data, 3D point cloud data, etc.) a set of equally ranked vehicle data types requested in lieu of other vehicle data types, and any other suitable preferences. In a third example, prioritizing the vehicle sensor data includes adjusting an existing ranking (e.g., for a data type) based on a request (e.g., prioritization request) for a single vehicle data type (e.g., identifying or retrieving the existing ranking of relative priority of vehicle data types and modifying the ranking according to the request, giving the single vehicle data type a higher relative priority than all other vehicle data types, etc.).

Prioritizing the vehicle sensor data can optionally include categorizing the vehicle sensor data according to the data's respective priority. Such categories can include critical vehicle sensor data (e.g., data relevant to real-time nominal operation of the vehicle), operational vehicle sensor data (e.g., data relevant to operational purpose of the vehicle, navigation, destination, owner/renter of the vehicle), user application vehicle sensor data (e.g., relevant to any other applications as determined by a user, such as via a remote query), or any other suitable data. Critical vehicle sensor data, operational vehicle sensor data, and user application vehicle sensor data may be discrete non-overlapping categories, or they may be partly or wholly overlapping. Vehicle sensor data can additionally or alternatively be categorized according to high, medium, and low priority categories (e.g., arbitrarily, according to a remote query, etc.). In one variation, vehicle sensor data with importance values (e.g., priority values) within a first range are associated with a high classification, vehicle sensor data with importance values within a second range are associated with a middle classification, vehicle sensor data with importance values within a third range are associated with a low classification. However, the classifications can be otherwise assigned.

Prioritizing the vehicle sensor data can optionally include estimating the compressibility of the vehicle sensor data. Estimating the compressibility of the vehicle sensor data functions to estimate the minimum size of the vehicle sensor data (e.g., after compression), which can be used for scheduling the vehicle sensor data to be transformed (e.g., compressed) and transmitted. The compressibility of the data can optionally be used to adjust the data priority (e.g., increase if smaller). However the compressibility can be otherwise used. The compressibility can be estimated based on the data contents, training data, a machine learning model for vehicle data compression (e.g., for a specific type of vehicle data), historical data (e.g., a database of compressibility of various data types), and any other suitable indicators of compressibility. Estimating the compressibility preferably occurs before prioritization of the vehicle sensor data, but can alternatively occur after prioritization and before scheduling, or at any suitable time point relative to other processes.

In a first variation, estimating the compressibility includes generating derivative vehicle sensor data and estimating the compressibility based on feedback from the derivative vehicle sensor data. This variation functions to create simulated data that can be transferred through the scheduling module and transformation module and provide feedback on the compressibility of the simulated data, and correlating the compressibility of the simulated data with the compressibility of the actual vehicle sensor data (e.g., based on a compressibility model). Derivative vehicle sensor data is preferably generated by deriving reduced order (e.g., reduced dimensionality) data from the vehicle sensor data; as such, the derivative vehicle sensor data is preferably easier to compress than the original vehicle sensor data to facilitate efficient estimation. Alternatively, derivative vehicle sensor data can be generated in any suitable manner.

The method can optionally include receiving a prioritization request (e.g., as a remote request, remote query, user query). Receiving a prioritization request functions to provide input from a user requesting vehicle sensor data and/or message data with particular characteristic(s). Prioritization requests are preferably received from the remote computing system, but can additionally or alternatively be received from the vehicle computing system (e.g., a vehicle operation module), application, operator (e.g., as defined rules), or any other suitable source. Prioritization requests are preferably generated in a cloud computing environment, but can alternatively be generated at the vehicle or any other suitable location. Prioritization requests can include requests for one or more data types, the prioritization scheme to be used (e.g., rules, data classes, weight function, ordering ranking of vehicle sensor data types from most to least important, etc.), data processing method (e.g., signal fusion algorithms), secondary data storage parameters (e.g., which data to be stored, sampling frequency of various data types, etc.), and any other suitable requests. It shall be understood that users (e.g., sources of a remote request) can include individuals (e.g., inside the vehicle, outside the vehicle), an external application (e.g., running on a remote server, a mobile device, in the cloud, etc.), an internal application (e.g., running on the vehicle computing system), another vehicle, an internal or remote database server, or any other suitable generator of queries.

A first variation of receiving a prioritization request includes receiving a third-party request from a user for an information type and determining which vehicle sensor data is associated with the information type. Determining the data associated with the information type can include determining the data itself (e.g., if the information type is a data type), data pre-associated with the information type, data in lieu of the information type (e.g., alternative data that can be used in a similar manner), and determining the data associated with the information type in any other suitable manner. A second variation of receiving a prioritization request includes receiving a prioritization request based on classification of vehicle sensor data as critical, operations-level, or other data, wherein the prioritization request is generated by the vehicle operations module.

The method can optionally include assigning metadata (e.g., by tagging the data, adding a header or footer to the data, etc.) to the vehicle sensor data. The metadata values can be used to schedule the message, determine which applications have access to the vehicle sensor data, or be used in any other suitable manner. The metadata can be assigned as the data is received at the system (e.g., contemporaneously), before and/or after the vehicle sensor data is processed (e.g., by the system, by a third-party application, etc.), such that the metadata can be assigned to: the vehicle sensor data itself (e.g., raw, processed), application outputs, and/or any other suitable message. Metadata can include a timestamp, the source of the data (e.g., sensor identifier, identifier of the processing module from which the data originates or has most recently been processed by, etc.), the compressibility of the data, an absolute or relative priority ranking (e.g., a numeric ranking), or any other suitable metadata.

In one variation, assigning metadata to the vehicle sensor data can include: determining a header for a message packet. The message packet can be determined through transforming vehicle sensor data into message data, as discussed below. The message packet can include a piece of vehicle sensor data (e.g., the requested piece of data), the vehicle sensor data and associated sensor measurements (e.g., concurrently recorded sensor measurements, such as geolocation) or tags (e.g., object classes), or include any other suitable data. The message header can include the message importance (e.g., determined by prioritizing the vehicle sensor data, below), the message size (e.g., actual or estimated, post-compression, compressibility, etc.), an endpoint identifier (e.g., an application identifier), a vehicle identifier, physical address in memory, and/or any other suitable information. However, the vehicle sensor data can be associated with any other suitable information.

The method can optionally include providing the prioritized data, or parameter thereof, to the scheduling module for scheduling. Prioritized data can be provided to the scheduler sequentially, with higher priority data provided to the scheduler first (e.g., at the head of a data queue). Additionally or alternatively, prioritized data can be provided in parallel, with data transferred through channels according to priority (e.g., higher bandwidth and/or lower latency channels for higher priority data).

In one variation, the entire message is passed to the scheduling module.

In a second variation, the header of the message is passed to the scheduling module, while the message itself is stored in short- or long-term storage. The scheduling module then schedules the message (e.g., using an optimization process, a cost-function process, etc.) based on the information in the header (e.g., data importance, message size). The headers can then be stored in short- or long-term storage (e.g., the same or different from the message storage) until the associated message is sent (e.g., upon when the headers are removed from storage or otherwise processed). When the message is to be sent (e.g., according to the schedule determined by the scheduling module), the message is retrieved from the message storage for transmission. Headers and/or messages can be moved from short-term storage to long-term storage in response to: short-term storage overflow, timer expiration, a threshold number of attempts being made, or occurrence of any other suitable event. In a specific example, the headers are moved to long-term storage when the short-term storage overflows. In this example, headers associated with high importance (e.g., based on the values) and/or age are preferentially moved to long-term storage. However, the headers can be otherwise moved.

Scheduling vehicle sensor data functions to determine the buffer to which vehicle sensor data should be transferred, as well as which vehicle sensor data should be transferred to the transformation module. Scheduling is preferably performed by a scheduler module of the vehicle computing system, but can alternatively be performed by any suitable module of the vehicle computing system or remote computing system.

In a first variation, the method includes a single scheduler module that allocates (e.g., distributes, transfers, optimally forwards) the messages (e.g., vehicle sensor data) to each available communication channel (e.g., based on an optimization analysis). In a first example of this variation, channeling vehicle sensor data in parallel includes sorting data into a multiplexer, with highest priority data going into a multiplexer channel designated as reserved for high priority data.

In a second variation, the method includes a scheduler module for each priority class (e.g., high, mid, low) that allocates the messages of the respective priority class across the available communication channels. In this variation, each scheduler module can have access to all available communication channels, wherein the proportion of each communication channel available to each scheduler module can be predetermined (e.g., high priority scheduler always gets 50% of each channel; 50% of a stable connection, such as 3G; a predetermined number of bytes for a given channel; etc.), dynamically determined (e.g., using a bidding system, etc.), or otherwise determined.

Scheduling the vehicle sensor data preferably includes determining a transmission order of the vehicle sensor data, determining a transmission channel for the vehicle sensor data, and can optionally include: transferring the vehicle sensor data to one or more of the transformation module, the buffer(s), and storage (e.g., long term memory).

In variations, scheduling can be performed by a scheduler (e.g., scheduling module). The scheduler preferably operates at a specified frequency (e.g., every 100 ms), but can alternatively operate in response to a trigger, at a non-periodic frequency (e.g., asynchronously), or in any other suitable manner. The vehicle sensor data received at and/or transferred to the scheduler preferably includes properties such as importance (e.g., priority, prioritization, weight) and size, but can additionally or alternatively include any suitable properties and/or characteristics. Size of vehicle sensor data preferably represents the actual (or estimated) size of the data packet (e.g., block, message, etc.) in bytes, but can alternatively have any suitable units. The importance preferably represents how important, critical or relevant the vehicle sensor data is as represented by a numeric value (e.g., integers in a range between negative and positive infinity). In variations, the importance (e.g., priority) can be chosen to correspond to monetary value (e.g., as determined by an operator, a remote query, etc.). The scheduler can, in variations, receive information related to the available bandwidth (e.g., a numerical value corresponding to the available bandwidth in gigabits per second) or other network quality metrics on which to base scheduling (e.g., determined by attempting to transmit information, received from the receiving system, received through a remote query, etc.) of one or more communication networks preferably available or accessible along a traveling path (or route) of the vehicle. Accordingly, in the case, that the vehicle comprises an autonomous vehicle or a vehicle operating with a predetermine route plan, the scheduler may function to identify the one or more communication networks along the route plan of the vehicle and also, determine network quality metrics of each of the identified communication networks. In a specific example, the scheduling module schedules vehicle sensor data for transmission based on the value assigned to available bandwidth (e.g., remaining available bandwidth increases in value as available bandwidth is used by sensor data scheduled for transmission) in order to maximize unused bandwidth. In another specific example, the value assigned to the available bandwidth is based on a pricing structure (e.g., agreed upon with a communications network provider) for marginal additional bandwidth usage, and the scheduling module schedules vehicle sensor data for transmission based on the value thus assigned.

In a specific example, the scheduler can determine an optimum subset of vehicle sensor data to transmit in order to maximize the overall priority (e.g., importance) of the transmitted data, given vehicle sensor data with known size(s) and importance. Dynamic programming can be used in order to find the optimum subset. In this example, the headers of vehicle sensor data that have not been forwarded to the transmission module are put in a dedicated headers buffer. The buffer is preferably large enough to contain (e.g., at all times) the messages that have not been transmitted (e.g., expired vehicle sensor data may be removed). However, if the headers buffer overflows (e.g., fills, reaches a threshold filling fraction), vehicle sensor data of low importance can be transferred to a permanent headers storage location (e.g., long term storage).

In a related specific example, vehicle sensor data can be grouped in three divisions (e.g., critical, operations, and applications). In this example, a fraction (e.g., within a range from 0 to a value B, where B is less than or equal to 1) of the bandwidth is reserved for each division, and a dedicated scheduling module corresponds to each division.

Determining transmission order functions to determine which buffer vehicle sensor data should be transferred to. There are preferably multiple buffers, such that determining transmission order includes discriminating between different buffers, but there can alternatively be a single buffer. Determining the transmission order can optionally include determining the queuing order in which vehicle sensor data is transferred to the buffer and/or is ordered within the buffer. Determining transmission order can be based on prioritization (e.g., higher priority vehicle sensor data can be designated for transmission first, and thus transferred to a buffer designated for high priority transmission and/or transferred to the transformation module directly), and can additionally or alternatively be based on network quality (e.g., the highest priority vehicle sensor data that can be transmitted over the available network bandwidth is transmitted first), or determined based on any other suitable parameter. Determining the transmission order can include: receiving vehicle sensor data from the prioritization module, receiving a network quality estimate, determining available buffers, assigning and transferring vehicle sensor data to an available buffer, and assigning and transferring vehicle sensor data to the transformation module.

Receiving a network quality estimate can include determining available (or anticipated available) network quality, and determining available transformation module and/or transmission module capacity based on the determined network quality.

Determining available buffers can include, in a first variation, determining if any (or all) buffers are full (e.g., via a flag set when a buffer fills). A second variation of determining available buffers can include determining if a buffer corresponding to a vehicle sensor data category and/or priority level is full.

Assigning and transferring vehicle sensor data to an available buffer can, for example, be performed based on the category, size, priority, or any other suitable characteristic of the vehicle sensor data. Likewise, assigning and transferring vehicle sensor data to the transformation module can be performed based on the category, size, priority, or any other suitable characteristic of the vehicle sensor data.

There can be any suitable number of buffers, designated in any suitable manner. For example, there can be a number of buffers equal to the number of categories of vehicle sensor data. In another example, there can be a number of buffers equal to the number of priority levels (e.g., a high priority buffer, medium priority buffer, and low priority buffer). In another example, there can be a single buffer, in which vehicle sensor is ordered for transmission by a first in, first out (FIFO) queuing scheme according to the priority level (e.g., highest priority data is entered into the queue first, such that it exits the buffer first).

Determining the transmission channel functions to determine when and how to transfer buffered data (e.g., vehicle sensor data stored in a buffer) to the transformation module for transformation and transmission. Determining the transmission channel can include identifying available channels and forwarding (e.g., transferring) the vehicle sensor data to the available channel(s). In variations, this can include receiving available network pathways from the vehicle computing system (e.g., 3G and Wi-Fi channels). In further variations, this can include measuring network throughput and determining the available channels based on the measured network throughput (e.g., the data throughput corresponds to a 4G data throughput).

In a first variation, determining the transmission channel includes reserving a percentage of the available bandwidth for critical data (e.g., 15%, 15%, 50%, etc.). In a second variation, determining the transmission channel includes reserving low-latency channels for high priority data, and high latency channels for user application data. In a third variation, the vehicle sensor data includes differently sized vehicle sensor data, and the transmission channels are determined according to the size of the vehicle sensor data (e.g., data of large size is designated for high bandwidth channels). In a fourth variation, the vehicle sensor data includes data of different priority levels, and data is subdivided based on the available channel(s) (e.g., high priority data is subdivided into smaller packets in order to accommodate a low-bandwidth channel). In a fifth variation, the vehicle sensor data includes data of different categories, and the data is assigned to different channels according to the quality of service (QoS) of each channel (e.g., a stable channel is reserved for critical data). In a specific example, a first network (e.g., a local area Wi-Fi network) is selected over a second network (e.g., a 3G cellular network) based on the reliability of the first network (e.g., determined by estimating the QoS) in combination with knowledge of its limited availability (e.g., routing data indicating that the vehicle will leave the coverage area of the Wi-Fi network within 2 minutes), and the first network is selected to send high priority data.

Determining network quality functions to provide an indication of the downstream quality (e.g., QoS, bandwidth) of the network for use in scheduling. Quality of service shall be understood to be the ability of the network (e.g., channel) to provide required data to a given user, application, stream, uplink, etc., or the ability to guarantee a specified level of network performance. Network quality can be determined based on the reliability, bandwidth, guaranteed service quality, latency, QoS, or any other suitable characteristic of the network or channel. In a first variation, the current network quality can be determined directly (e.g., by transmitting a test signal, handshake, ping, or similar message over the network and receiving an indication of the network quality as a result).

In a second variation, determining network quality includes estimating network quality. Estimating network quality can be performed based on knowledge of the vehicle route (e.g., from a navigation module, from a GPS sensor) and the network quality along the known route, scheduled network availability, data received from the network (e.g., a remote query), data received from other vehicles along the future route of the vehicle, or based on any other suitable inputs. In a first variation, estimating network quality includes forecasting that the vehicle route passes through a low-latency network area (e.g., a 5G network area) based on historical transits of the area (e.g., from previous routes stored in onboard storage, received from the remote computing system, etc.). In a second variation, network quality is estimated based on a machine-learning model of network quality in the context of the vehicle (e.g., geographic area, time of day, local weather, or any other suitable context parameters). In a third variation, estimating network quality includes receiving messages from vehicles further ahead on the same (or similar) routes as the vehicle that include the present network quality experiences by those vehicles' network connections.

Determining network quality can include determining the bandwidth allocation for each channel. Bandwidth allocation shall be understood to be the amount of bandwidth for each channel to allocate to each buffer, priority class, or other differentiating factor of the vehicle sensor data. In a first variation, determining the bandwidth allocation includes allocating bandwidth for each channel in order to ensure that all critical and/or high priority data is transformed and transmitted. In a second variation, bandwidth can be allocated as specified in a prioritization request (e.g., remote query).

Determining the transmission channel can include transferring the vehicle sensor data based on the determined route, which functions to deliver the vehicle sensor data to the determined channel. In variations, this can include providing vehicle sensor data to the transformation module, in cases wherein the determined channel is for immediate transmission. In other variations, this can include providing vehicle sensor data to the appropriate buffer (e.g., critical, operations, or user application buffers) in cases wherein the determined channel is for buffering.

Transforming vehicle sensor data into message data functions to convert vehicle sensor data into a suitable format for storage and/or transmission, after receipt of the vehicle sensor data from the scheduling module. Message data shall be understood to be data that is in a suitable format for storage and/or transmission (e.g., a packet, bitstream, buffered message, etc.). In one variation, the vehicle sensor data is in a suitable format for transmission without transforming it, and transforming vehicle sensor data into message data includes passing vehicle sensor data directly to the transmission module without modification. In a second variation, the vehicle sensor data is compressed into message data; compression can be intelligent compression (e.g., based on a machine learning model of the vehicle sensor data that permits errors to be transmitted in lieu of the entirety of the sensor data), lossless compression, lossy compression, or any other suitable compression. In a third variation, transforming vehicle sensor data into message data is based on the vehicle sensor data by adding metadata to the vehicle sensor data (e.g., header packets, footer packets) that enable transmission. Transforming vehicle sensor data into message data can additionally or alternatively be performed in any suitable manner.

The method can include transmitting message data. Transmitting message data functions to provide the message data from the vehicle to the user. Transmitting message data is preferably performed by a transmitter (e.g., transmission module) of the vehicle using a wireless network (e.g., 3G, 5G, LTE, Wi-Fi, etc.), a wired connection (e.g., an Ethernet connection while the vehicle is parked), a combination of wireless networks and wired connections, or by any suitable communication module over any suitable data connection. Transmitting message data preferably occurs after transformation of vehicle sensor data to message data, but can additionally or alternatively occur at any suitable time. Transmitting message data can occur upon occurrence of a trigger event (e.g., an event indicating that information is to be transmitted). A trigger event can be a binary trigger event (e.g., indicating either to send or not send message data), and/or can include a request for a specific information type. In variations, the trigger event can include a direct request (e.g., a prioritization request requesting immediate transmission), timing information (e.g., a schedule for data transmission that initiates trigger events periodically every 10 seconds, 1 minute, 2.5 minutes, etc.), or any other suitable trigger.

In variations, transmitting message data occurs automatically according to the determined transmission order (e.g., the schedule(s) determined by the scheduling module(s)). In a first variation, all critical data is first transmitted until the critical buffer is empty, then the operational data is transmitted until the operations buffer is empty, and then user application data is transmitted until the application buffer is empty. In a second variation, transmitting message data includes determining a first threshold data size for a first available channel based on available bandwidth, and transmitting all message data under the first threshold size through the first available communication channel in decreasing priority order. The second variation also includes concurrently determining a second threshold data size for a second available channel (e.g., with higher bandwidth than the first communication channel) and transmitting data between the first and second threshold data size through the second communication channel in decreasing priority order. In a third variation, transmitting message data includes detecting (e.g., receiving) information (e.g., by way of a pingback, message data from a cloud computing environment, etc.) that a high bandwidth uplink is available, and retrieving low priority data of a large size from the low priority buffer and transmitting it over the high bandwidth uplink. A fourth variation includes transmitting message data in response to occurrence of a trigger event, and transmitting directly from a buffer. Transmitting message data can optionally include waiting for confirmation of successful transmission, and retransmitting (e.g., resending) message data until a termination event occurs. A termination event can be a predetermined number of attempts having occurred, a confirmation having been received, a timeout, or any other suitable termination event.

Message data can be transmitted over various channels, such as Bluetooth low energy (BLE), 5G cellular, and 3G cellular, each of which can have particular characteristics (e.g., bandwidth ranges, stability ranges, latency, etc.). These particular characteristics are preferably determined in accordance with various portions of the method, and can be used as a basis for any suitable method process.

The method can include storing vehicle sensor data, which functions to retain vehicle sensor data in long term onboard storage for wired transmission or eventual wireless transmission. Storing vehicle sensor data can include receiving vehicle sensor data from the scheduling module and/or one or more buffers into long term storage.

The method can include storing message data, which functions to retain message data in one or more buffers for wireless transmission. In some cases, vehicle sensor data transformed into message data can be stored instead of transmitted (e.g., due to degradation in network quality); accordingly, such message data can be stored in a buffer (e.g., a high priority buffer) to facilitate transmission at the next available opportunity.

The method can optionally include retrieving vehicle sensor data and/or message data from memory (e.g., buffers, long term storage, etc.), which functions to move data from short and long term storage back into one or more of the scheduling, transformation, and/or transmission modules. Retrieving vehicle sensor data and/or message data can be based on a trigger event, in a similar manner as described above. A first variation includes retrieving vehicle sensor data in response to detecting that the vehicle system is connected to a high bandwidth, low latency connection (e.g., an Ethernet connection), wherein the vehicle sensor data was placed in long term storage until such an instance that a high bandwidth, low latency connection was available. A second variation includes retrieving message data in response to detecting that a communication network with a predetermined set of parameters is available. In a specific example, this can include detecting that a 4G LTE network connection is available (e.g., receiving a pingback from a 4G LTE cell tower indicating a high QoS of the network).

The method can optionally include reprioritizing vehicle sensor data and/or message data. Reprioritizing is preferably performed after scheduling data (e.g., vehicle sensor data, message data) for transmission, but can alternatively be performed after storing data in a buffer, retrieving data from a buffer, or at any other suitable time. For example, data stored in the buffer can be reprioritized periodically (e.g., every 1 second) and/or data in a buffer can be reprioritized upon reception of data (e.g., at the buffer, from a remote computing system, etc.). Reprioritizing vehicle sensor data and/or message data can include: determining an updated priority by repeating any of the processes described above (e.g., automatically prioritizing the vehicle sensor data, reassigning an importance value to the vehicle sensor data based on a remote request, determining a new priority based on other data's relative priorities, determining a new priority due to time lapse, etc.) or otherwise determining an updated priority for the vehicle sensor and/or message data. The reprioritized vehicle sensor and/or message data can be: moved to a different buffer (e.g., based on the newly-determined priority), reordered within the same buffer, or otherwise reallocated (e.g., transferred, transmitted, stored, retrieved, etc.) based on the updated priority. However, the vehicle sensor and/or message data can be otherwise reprioritized.

Figure 2:
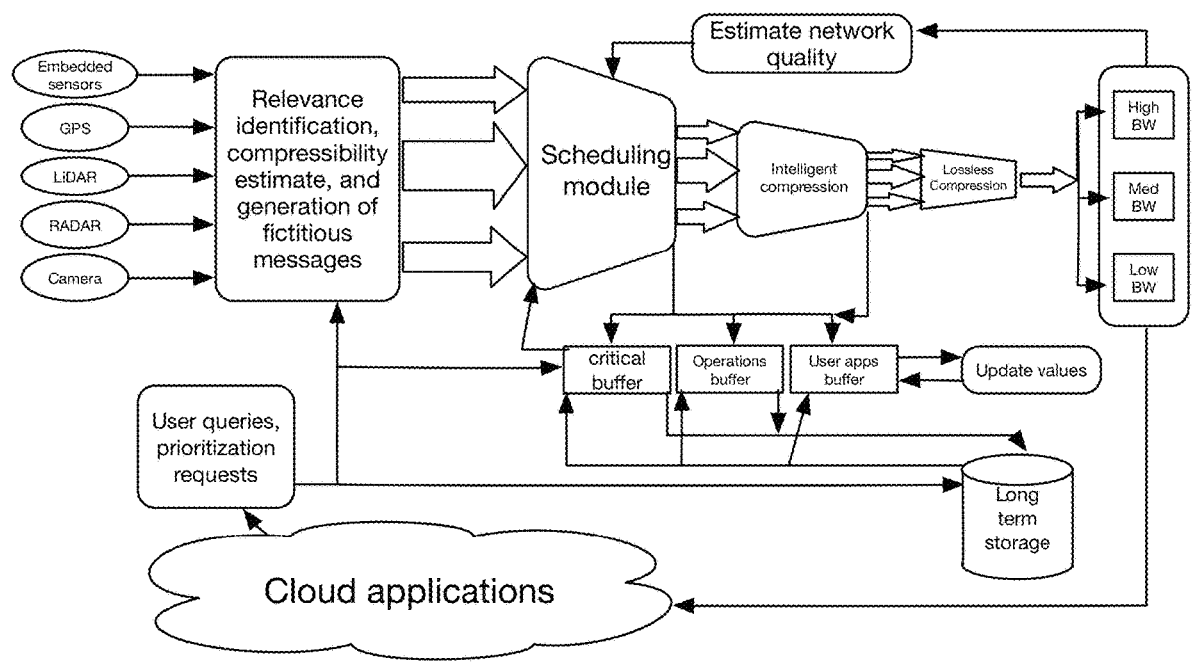
FIG. 2 is a flowchart representation of an example implementation of the method.

In a specific example of the method, as shown in FIG. 2, vehicle sensor data is received at the prioritization module from embedded sensors, GPS, LiDAR, radar, photographic and videographic cameras. User queries and prioritization requests are also received at the prioritization module. The vehicle sensor data is prioritized and categorized according to critical data, operations data, and user applications data categories, ranked in descending order of priority respectively. The prioritized data is transferred to the scheduling module, where the vehicle sensor data is scheduled according to the prioritization ranking in combination with the estimated network quality. The data is then transferred to the appropriate buffer (e.g., critical data is transferred to the critical data buffer), and forwarded to the transformation module based on the quality of the available network (e.g., the QoS, bandwidth, etc.). The transformation module includes both intelligent compression, after which some message data (derived from the vehicle sensor data) is returned to the buffers, and lossless compression, after which the message data is transferred to the transmission module (e.g., the transmitter). The data is allocated to the appropriate channel according to size (e.g., large blocks of data are transmitted via the high bandwidth channel) and transmitted. The transmitter generates an estimate of current network performance, which is then used to update the estimation of current network quality to provide to the scheduling module. At least a portion of the transmitted data is transmitted to cloud-based applications, where additional user queries can be generated based on the received transmitted data. In this specific example, user queries and prioritization requests can be received at the buffers and long term storage, and can thereby trigger retrieval of stored message data and/or vehicle sensor data from the buffers (e.g., directly for transmission, for transfer to the scheduling module, etc.). The values of data stored in the buffers can additionally or alternatively be updated while residing in the buffers (e.g., time stamps can be updated as time passes).

Figure 6:
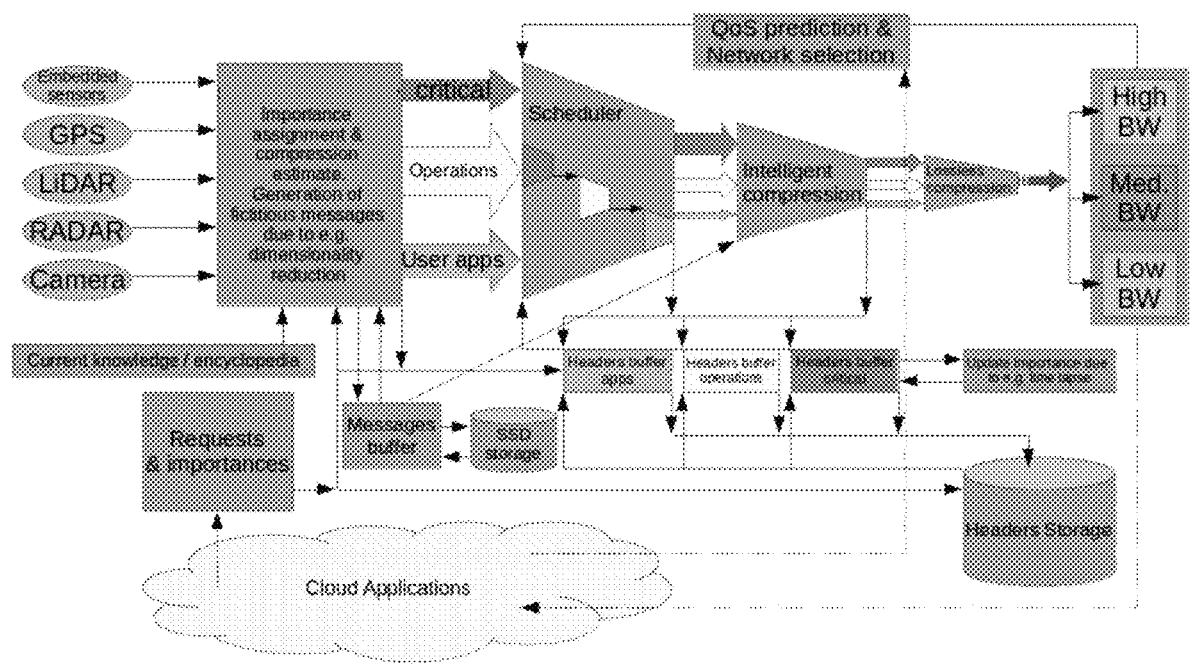
FIG. 6 is a flowchart representation of an example implementation of the method.

In a related example, as shown in FIG. 6, metadata (e.g., headers) associated with the vehicle sensor data at the prioritization module are stored separately from the vehicle sensor data in distinct buffers (e.g., a user applications headers buffer, an operations headers buffer, and a critical headers buffer). In this example, the scheduling module schedules vehicle sensor data based on the metadata, and when vehicle sensor data is scheduled for transformation and/or transmission it is retrieved from a vehicle sensor data buffer (e.g., a messages buffer) and/or other memory (e.g., SSD storage).

Figure 3:
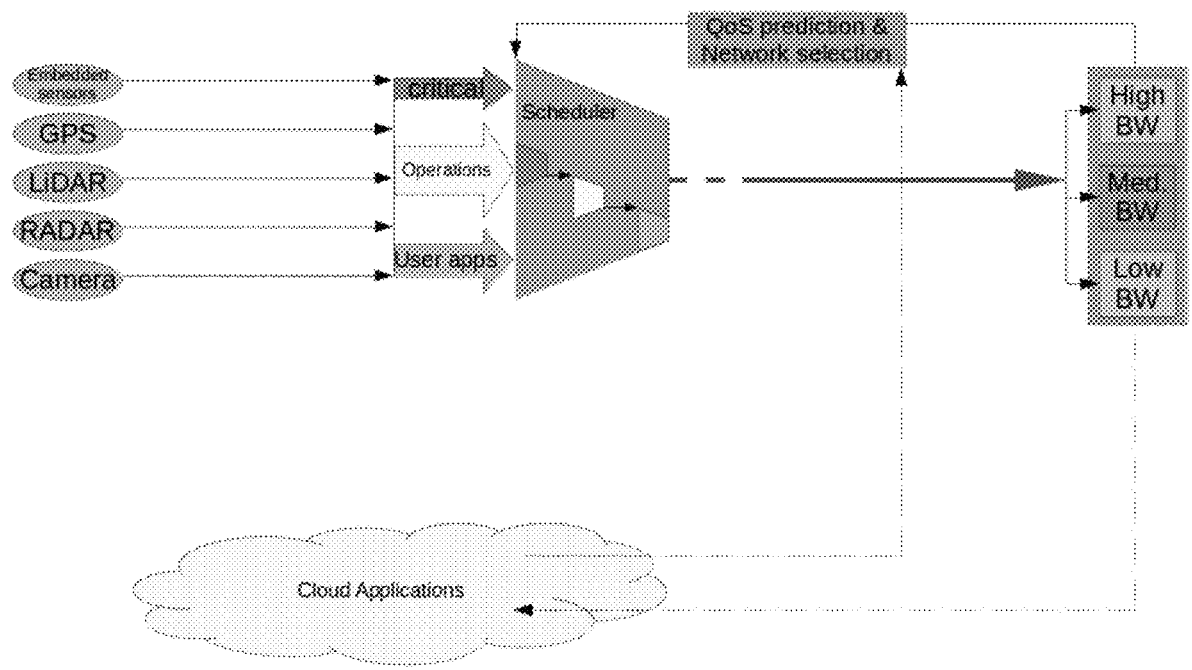
FIG. 3 is a flowchart representation of an example implementation of the method.
Figure 4:
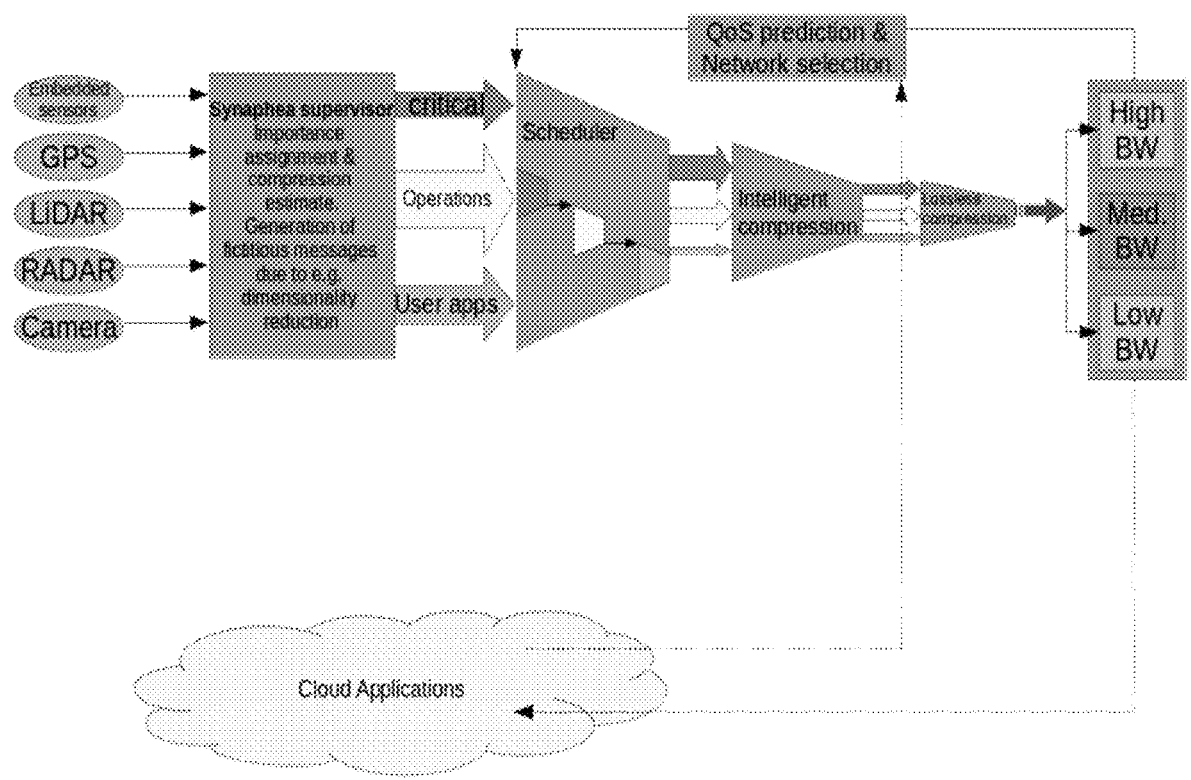
FIG. 4 is a flowchart representation of an example implementation of the method.
Figure 5:
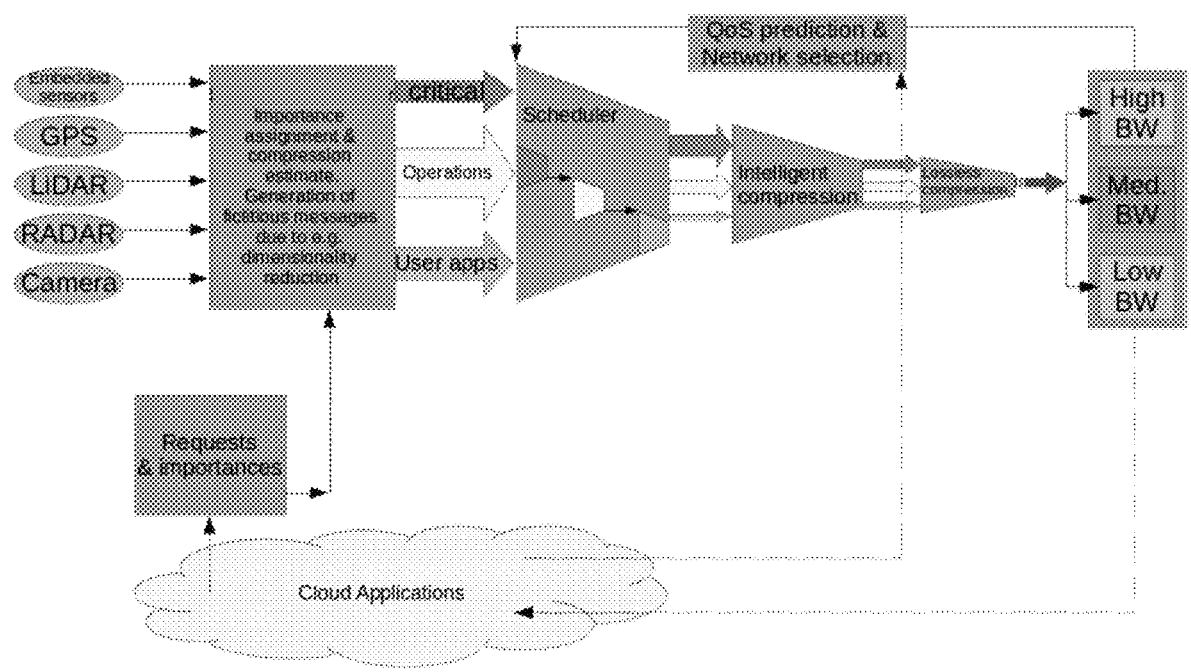
FIG. 5 is a flowchart representation of an example implementation of the method.

In another example implementation, as shown in FIG. 3, the method can include: receiving pre-categorized vehicle sensor data, scheduling the vehicle sensor data for transmission without buffering, and transmitting the vehicle sensor data uncompressed over either a high bandwidth, medium bandwidth, or low bandwidth network channel. In this example, scheduling is performed based on network quality prediction, and the selected network (e.g., high bandwidth, medium bandwidth, low bandwidth) channel over which the vehicle sensor data is to be transmitted. The data is transmitted to one or more cloud applications, which provide network quality feedback and network selection feedback to the scheduler in response. In a related example, as shown in FIG. 4, the raw data (e.g., vehicle sensor data) is received at a prioritization module that assigns importance to the raw data and categorizes it into critical, operations, and user applications data streams before transferring it to the scheduler. In this example, the scheduler transfers the scheduled data through an intelligent compression module and a lossless compression module prior to transmission. In another related example, as shown in FIG. 5, the cloud applications can generate remote requests (e.g., that include importance information and/or prioritization schemes to be applied to the vehicle sensor data) and transmit the remote requests to the prioritization module.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. An on-board vehicle computing system comprising:
    at least one computer processor; and
    a non-transitory medium comprising computer-executable instructions that, when executed by the at least one computer processor, implement steps of:
        collecting vehicle sensor data from at least one onboard vehicle sensor included in a vehicle;
        generating a vehicle sensor data schedule;
        estimating network quality of one or more communication networks based on a route of the vehicle and data received from at least one other vehicle along the route of the vehicle;
        selecting at least one communication network based on the network quality; and
        via at least one selected communication network, transmitting the vehicle sensor data according to the vehicle sensor data schedule.

2. The on-board vehicle computing system of claim 1, wherein generating a vehicle sensor data schedule comprises determining a transmission order of a plurality of vehicle sensor data types of the vehicle sensor data, and wherein transmitting the vehicle sensor data comprises: transmitting the vehicle sensor data according to the transmission order.

3. The on-board vehicle computing system of claim 1, wherein the instructions, when executed, implement a step of:
    identifying a level of importance for each of a plurality of vehicle sensor data types included in the vehicle sensor data; and
    selectively transforming vehicle sensor data into message data, based on the level of importance for each of the plurality of vehicle sensor data types, wherein transmitting the vehicle sensor data comprises: transmitting the message data.

4. The on-board vehicle computing system of claim 1, wherein generating the vehicle sensor data schedule comprises:
    identifying a storage scheme selected from a hierarchy of data storage types for each of a plurality of vehicle sensor data types, and
    specifying the storage scheme in the vehicle sensor data schedule.

5. The on-board vehicle computing system of claim 1, wherein the route of the vehicle is a predetermined route.

6. A method comprising: with an on-board vehicle computing system of a vehicle:
    collecting vehicle sensor data from at least one onboard vehicle sensor included in the vehicle;
    generating a vehicle sensor data schedule;
    estimating network quality of one or more communication networks based on a vehicle route of the vehicle and data received from at least one other vehicle along the route of the vehicle;
    selecting at least one communication network based on the network quality; and
    via at least one selected communication network, transmitting the vehicle sensor data according to the vehicle sensor data schedule.

7. The method of claim 6, wherein generating a vehicle sensor data schedule comprises determining a transmission order of a plurality of vehicle sensor data types of the vehicle sensor data, and
    wherein transmitting the vehicle sensor data comprises:
        transmitting the vehicle sensor data according to the transmission order.

8. The method of claim 7, further comprising, identifying a level of importance for each of a plurality of vehicle sensor data types included in the vehicle sensor data.

9. The method of claim 8, wherein determining the transmission order comprises:
    determining the transmission order based on the level of importance for each of the plurality of vehicle sensor data types.

10. The method of claim 9, further comprising:
    receiving from a remote computing system, via a communication network, a prioritization request that specifies a vehicle sensor data type; and
    advancing a position of the vehicle sensor data type in the transmission order of the vehicle sensor data schedule.

11. The method of claim 9, wherein identifying a level of importance for each of a plurality of vehicle sensor data types included in the vehicle sensor data comprises:
    identifying a level of importance of at least one vehicle sensor data type based on one or more rules identified by a prioritization request received from a remote computing system via a communication link.

12. The method of claim 9, wherein identifying a level of importance for each of a plurality of vehicle sensor data types included in the vehicle sensor data comprises:
    identifying a level of importance of at least one vehicle sensor data type based on a machine learning algorithm.

13. The method of claim 9, wherein identifying a level of importance for each of a plurality of vehicle sensor data types included in the vehicle sensor data comprises:
    receiving information identifying an importance for at least one vehicle sensor data type from a third-party application executed by a computer processor of the vehicle.

14. The method of claim 9, wherein identifying a level of importance for each of a plurality of vehicle sensor data types included in the vehicle sensor data comprises:
    for at least one vehicle sensor data type, estimating a minimum compression size for the vehicle sensor data type, and
    identifying the level of importance for the vehicle sensor data type based on the minimum compression size.

15. The method of claim 14, wherein vehicle sensor data types having a lower minimum compression size are assigned a higher level of importance as compared to vehicle sensor data types having a higher minimum compression size.

16. The method of claim 9, wherein identifying a level of importance for each of a plurality of vehicle sensor data types included in the vehicle sensor data comprises:
   for at least one vehicle sensor data type, identifying the level of importance for the vehicle sensor data type based on characteristics of the vehicle sensor data for the vehicle sensor data type.

17. The method of claim 9, wherein identifying a level of importance for each of a plurality of vehicle sensor data types included in the vehicle sensor data comprises:
   for at least one vehicle sensor data type, identifying the level of importance for the vehicle sensor data type based on internal vehicle criterion.

18. The method of claim 8, further comprising: selectively transforming vehicle sensor data into message data, based on the level of importance for reach of the plurality of vehicle sensor data types, wherein transmitting the vehicle sensor data comprises: transmitting the message data.

19. The method of claim 9, further comprising: generating filtered vehicle sensor data by selectively filtering out select data frames from the vehicle sensor data whose differences with prior data frames are below a redundancy threshold, wherein transmitting the vehicle sensor data comprises: transmitting the filtered vehicle sensor data.

20. The method of claim 6, wherein generating the vehicle sensor data schedule comprises: identifying a storage scheme selected from a hierarchy of data storage types for each of a plurality of vehicle sensor data types, and specifying the storage scheme in the vehicle sensor data schedule.

* * * * *